(12) United States Patent
Bracamonte

(10) Patent No.: US 9,676,631 B2
(45) Date of Patent: Jun. 13, 2017

(54) REACTION BONDED SILICON CARBIDE BODIES MADE FROM HIGH PURITY CARBONACEOUS PREFORMS

(71) Applicant: Lori Bracamonte, Tucson, AZ (US)

(72) Inventor: Lori Bracamonte, Tucson, AZ (US)

( * ) Notice: Subject to any disclaimer, the term of this patent is extended or adjusted under 35 U.S.C. 154(b) by 107 days.

(21) Appl. No.: 14/336,284

(22) Filed: Jul. 21, 2014

(65) Prior Publication Data

US 2016/0016807 A1   Jan. 21, 2016

(51) Int. Cl.
*C01B 31/36*   (2006.01)

(52) U.S. Cl.
CPC .................................. *C01B 31/36* (2013.01)

(58) Field of Classification Search
None
See application file for complete search history.

(56) References Cited

U.S. PATENT DOCUMENTS

| | | |
|---|---|---|
| 3,951,587 A | 4/1976 | Alliegro |
| 4,221,831 A | 9/1980 | Kostikov |
| 4,265,843 A | 5/1981 | Dias |
| 4,477,493 A | 10/1984 | Parkinson |
| 4,564,496 A | 1/1986 | Gupta |
| 4,722,762 A | 2/1988 | Luhleich |
| 4,737,476 A | 4/1988 | Hillig |
| 4,761,134 A | 8/1988 | Foster |
| 4,863,657 A | 9/1989 | Tanaka |
| 4,882,102 A | 11/1989 | Kawakubo |
| 4,998,879 A | 3/1991 | Foster |
| 5,079,195 A | 1/1992 | Chiang |
| 5,082,807 A | 1/1992 | Gesing |
| 5,152,938 A | 10/1992 | Suda |
| 5,205,970 A * | 4/1993 | Brun ..................... C04B 35/573 264/340 |
| 5,248,705 A | 9/1993 | McGuigan |
| 5,294,300 A | 3/1994 | Kusuyama |
| 5,338,576 A | 8/1994 | Hanzawa |
| 5,366,686 A | 11/1994 | Mortensen et al. |
| 5,509,555 A | 4/1996 | Chiang |
| 5,571,758 A | 11/1996 | Grossman |
| 5,618,767 A | 4/1997 | Benker |
| 5,702,997 A | 12/1997 | Dynan |
| 5,972,818 A | 10/1999 | Dynan |
| 6,024,898 A | 2/2000 | Steibel |
| 6,025,065 A | 2/2000 | Claussen |

(Continued)

OTHER PUBLICATIONS

AMMRC TR 83-5, Jan. 1, 1983, Hucke, Edward E.
Interim Report for Contract DAAG46-80-C-0056-P0004 "Process Development for Silicon Carbide Based Structural Ceramics".

*Primary Examiner* — Guinever S Gregorio
(74) *Attorney, Agent, or Firm* — William R Bachand

(57) ABSTRACT

A process for producing reaction bonded silicon carbide (RBSC) from high purity, porous, essentially all-carbon preforms through contacting said preforms with silicon metal at room temperature, and subsequently heating to melt silicon metal and cause infiltration into said preform causing reaction to silicon carbide and leaving residual silicon, to result in a dense silicon carbide-silicon composite. The process offers the ability to produce RBSC with higher purity, higher strength, and lower cost as long as the carbonaceous preforms are of sufficient purity and pore size distribution to allow for uniform, crack-free bulk bodies to be fabricated.

5 Claims, 1 Drawing Sheet

(56) References Cited

U.S. PATENT DOCUMENTS

| | | | |
|---|---|---|---|
| 6,231,791 B1 * | 5/2001 | Heine | C04B 35/573 264/29.5 |
| 6,554,897 B2 * | 4/2003 | Golan | C30B 23/00 117/107 |
| 6,919,127 B2 | 7/2005 | Waggoner | |
| 7,335,331 B1 | 2/2008 | Husnay | |
| 2013/0243682 A1 * | 9/2013 | Park | C01B 31/36 423/346 |
| 2014/0048978 A1 | 2/2014 | Taxacher | |

* cited by examiner

REACTION BONDED SILICON CARBIDE BODIES MADE FROM HIGH PURITY CARBONACEOUS PREFORMS

This application claims the benefit of U.S. Provisional Application No. 61/856,741, filed Jul. 21, 2013, the entire contents of which are incorporated herein by reference.

FIELD OF THE INVENTION

The invention relates to reaction bonded silicon carbide (RBSC) components, especially those used in heating furnaces. The invention is particularly useful in forming high purity RBSC components, such as diffusion components for a semiconductor diffusion furnace.

BACKGROUND OF THE INVENTION

RBSC components are used in many different applications, including kiln furniture, mechanical seals, burner nozzles, radiant tubes, and heating elements. RBSC components are increasingly replacing polysilicon or quartz components in many high temperature applications. Silicon carbide (SiC) is superior for use in such applications because SiC is chemically and mechanically more stable than polysilicon or quartz at high temperatures.

SiC components are used in standard applications—which do not require high purity SiC—and in applications which require high purity and even ultrahigh purity SiC. For example, ultrahigh purity SiC is required to make kiln furniture for use during the manufacture of semiconductor devices. Such components are typically SiC composites composed of a mixture of SiC and silicon (Si) metal rather than 100% SiC, and are termed reaction formed or reaction bonded SiC. Reaction forming of ceramics as an alternative to conventional processing has been of general interest for a long time. Fabrication of these bodies generally involves forming a green body using various standard routes, such as extrusion, slip casting, and dry pressing. The green body consists mostly of SiC, a significantly lesser amount of carbon or graphite, and a polymeric binder. The green body is heat treated to carbonize the binder, and then infiltrated with liquid Si. The Si reacts with the carbon or graphite to form new SiC, which bonds the SiC starting material together (hence the name "reaction bonding").

The processing of the present invention is similar to RBSC except that the green body, or preform body, contains no SiC and only carbonaceous components—except for impurities that are introduced either in the raw materials or through the fabrication process. The SiC in the final product is formed through the Si+C→SiC reaction. This reaction is highly exothermic, which causes substantial increases in temperature. For typically processed RBSC with only a small amount of carbon as a binding phase, the change in temperature is not extreme. For carbonaceous preforms with no SiC, the mass of the carbon reactant is much greater per unit volume, with even small samples increasing in temperature by more than 500-1000 degrees in a matter of seconds. Temperatures can be so extreme as to vaporize the non-carbon components of the preform resulting in porosity and flaws in the resulting RBSC composite. The porosity may subsequently be filled with molten Si metal (leaving Si "spots") or, if the sample gets hot enough, the Si will also be vaporized leaving big pores behind as in 2 of FIG. 1. The top sample 2 is much larger and demonstrates significant porosity resulting from extreme temperatures incurred during infiltration. The bottom sample 1 is much thinner and smaller and shows no such flaws, presumably because much lower temperatures were realized during infiltration. There are not many materials that can withstand temperatures in excess of e.g., 2500° C., and thus the greater the amount of impurities in the carbonaceous preforms, the more material that is vaporized. In addition to resulting in inhomogeneous RBSC products, significant thermal stress in the component is incurred, and for bulk pieces above a certain size where the temperature increase is more significant, this can cause cracking or extensive fracture of the reacted materials. Thus, to date there are no commercial bulk RBSC products produced using all-carbon (no SiC) preforms, even though there are significant advantages to be gained by being fabricated in this manner.

The numerous advantages of RBSC even by standard techniques (i.e., silicon melt infiltration in SiC preforms) are well documented, and include low processing temperatures, low raw material costs, near-net-shape tailorability, and low-to-zero shrinkage capability. By using carbonaceous preforms with no SiC, even lower cost fabrication is possible due to the ease of machining (i.e., graphite is much easier to machine than SiC) and from potentially lower temperature processing. The ability to purify the carbonaceous preforms to >99.995% by high temperature heat treatment contributes to higher purity products. SiC preforms cannot withstand the same purification conditions, and thus cannot compete with the purity achievable using all-carbon preforms. Also, higher strength values can be achieved due to the ability to use finer sized powders for preform fabrication. Finer grain size in ceramics directly translates to higher strength.

SUMMARY OF THE INVENTION

The present invention provides a method of forming a bulk SiC body comprising forming a porous carbonaceous preform body consisting essentially of carbon atoms from carbon sources selected from the group consisting of a carbon powder, a graphite powder, an organic binder (as an integral component), and a combination thereof; and, infiltrating the porous carbonaceous preform body with silicon under conditions to react a majority of the carbon with the silicon to form silicon carbide. Bulk carbonaceous preforms above a certain size (and mass) must be of certain minimum purity level to produce uniform RBSC bodies without significant porosity or areas of excess silicon. Silicon "spots" are caused by volatilization of impurities in the preform that results in pores that are subsequently filled with molten silicon during infiltration. The exothermic reaction of silicon with carbon causes significant temperature increases, the extent of which depends on the preform mass and composition. Thus, the purity requirements of each carbonaceous preform will vary but there will be a minimum requirement for each individual system for producing homogeneous RBSC from porous carbonaceous preforms.

DETAILED DESCRIPTION OF THE INVENTION

Figure 1:
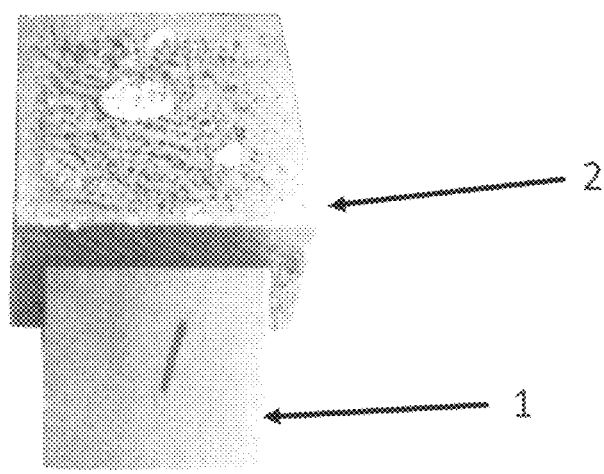
FIG. 1 is a photograph of two RBSC samples of different sizes and different amounts of porosity.

The invention is directed to a family of SiC components with an amount of Si metal in the range of from about 5 vol % to about 40 vol %. The processing used to make the SiC components most closely resembles that employed in the production of reaction-formed or reaction-bonded SiC (RBSC) bodies.

Fabrication of a component generally involves the use of standard forming techniques, such as slip casting, extrusion, or pressing, to form a preform body which consists of powdered carbon and/or powdered graphite, and phenolic resin or other organic as an integral part of the body (rather than just a few percentage typically used). The preform body is then heat treated to convert the phenolic resin or organic binder phase to carbon or graphite.

The next step is to infiltrate the body with Si, which reacts with the carbon source to form new SiC. The present invention has the advantage that the preform body preferably is contacted with Si metal, e.g. powders, chips, or pieces of Si wafers, at room temperature. Only after contact is made are the Si pieces heated to the melting point of Si. Contacting the Si metal with the preform body at room temperature rather than at the higher melt or vaporization temperature of Si reduces energy and equipment costs.

The resulting composites contain <5% porosity. Initial experiments resulted in RBSC with 3-point flexural strengths in the range of from about 200 MPa to 483 MPa. The variation was due to non-uniformity within the products in the way of Si spots and/or veins. Optimization of uniformity should result in strengths consistently at the upper end of this range.

The carbonaceous powder is selected from the group consisting of a carbon powder; a graphite powder, a phenolic resin powder, sugar, or other binding material; and a combination thereof. A preferred system is graphite powder combined with phenolic resin powder. For the highest strength RBSC composites, to reduce the chance of cracking, and for the best infiltration results, fine grain sized graphite or carbon powders are preferred, most preferably powders having an average particle size of about 15 µm or less. Substantially any commercially available carbon or graphite powder may be used as long as the powder has a purity level commiserate with that required to achieve uniformity of the final RBSC body. Larger RBSC bodies will require higher purity levels than small RBSC bodies below a certain critical mass. Typically, the powders should have a purity of at least 99% carbon, and most preferably above 99.9% carbon.

Suitable graphite powders include, but are not necessarily limited to, HPM850, available from Asbury Graphite Mills, Inc., located in Asbury, N.J. and TIMREX KS6, available from Timcal America, located in Westlake, Ohio. The grain and pore size distribution as well as density of the carbonaceous preforms are dependent upon the type of graphite or carbon powders used and the ratio of graphite or carbon to resin.

The powder constituents should be well mixed, preferably in a liquid medium. Deionized water is the preferred medium, but other solvents may be used to form a slurry as long as drying and heat treatment either converts the solvent to carbon, leaving no impurities, or the solvent completely evaporates from the preform body during subsequent drying and heating. Other suitable solvents include alcohols, as long as a suitable dispersion of powder components is obtained.

The produced slurries could be filtered and dried for dry pressing, or used to slip cast simple or complex shaped preforms. The slurry dispersion is dependent on the amount of solvent and type and amount of dispersants. The amount of solvent used for slip casting should be enough to produce a slurry with sufficiently low viscosity to produce the required density preform which results in the desired amount of SiC in the final RBSC product, typically at least 85 volume % SiC.

The strength of ceramic materials is known to increase as grain size decreases. The present invention permits the use of fine sized powders because a lower vol %—or lower density—is required of the preform in order to achieve a given vol % SiC in the final product. For example, if the desired product has 85 vol % SiC and 15 vol % Si, and if the starting powder is SiC, then either (a) 85 vol % SiC powder must be used to make the preform body, or (b) somewhat less than 85 vol % SiC may be used, and the body must be presintered at high temperatures to achieve 85 vol % SiC. This is because the SiC powder is the majority source of SiC in the final product with only a small amount provided by the carbonaceous binding phase after reaction with molten Si. In contrast, if the source of carbon for SiC is carbon or graphite powder and phenolic resin, as claimed, lower packing densities may be used. The lower packing density requirements allow the use of fine sized powders of a single size distribution (rather than, say, bimodal). Once the organic component of the resin is removed, the carbonaceous powder consists primarily of carbon atoms, which reacts with the infiltrating Si to form a larger vol % of SiC than the vol % of the carbonaceous powder reacted. For example, a product with about 85 vol % SiC can be achieved using less than 85 vol % carbonaceous powder because it only requires a preform density in the range of from about 50 vol % to about 60 vol % of theoretical, which reacts with infiltrating Si to produce a total of 85 vol % SiC in the final product.

Phenolic resin is added as an organic binder to add strength to the carbonized preform and to provide more carbon after pyrolyzation. The carbonaceous preform in this invention has a much larger amount of organic binder than is typically used. At least 10 wt % is required, and more preferably at least 30 wt %, to achieve the desired density/porosity and also to withstand the stresses associated with the molten Si infiltration step. Suitable phenolic resins include liquids and powders, preferably powders—particularly when the technique used to form the part is slip casting. The phenolic resin used should decompose upon heat treat under the conditions given to leave pure carbon. If a phenolic resin powder is used, the powder preferably should have a grain size of about 15-30 µm. A preferred phenolic powder is DUREZ PHENOLIC, which is available from Occidental Chemical Corporation, Niagara Falls, N.Y., at a grain size of about 24 µm.

For slip casting or any other forming technique which uses powder in a slurry, it is important to obtain a uniform dispersion of the powder in the fluid. A uniform dispersion will also produce a uniform porosity in the final product. The degree of dispersion can be measured by taking viscosity readings, where a lower viscosity indicates a better dispersion. In order to obtain a uniform dispersion, a dispersant preferably is used in forming the slurry. Suitable dispersants include, but are not necessarily limited to, polyethyleneimines and Nuosperse W22 from Elementis Specialties. Nuosperse W22 was previously called DISPERSE-AYD W-22 from Daniel Products Co., Jersey City.

In a preferred embodiment, DISPERSE-AYD W-22 was used in an amount of 7 wt % based on the total weight of graphite and resin powders in the slurry, and achieves a viscosity of about 4 cp (according to an in-house viscometer). The amount of dispersant used should be as little as possible for the highest powder loading possible in order to achieve a viscosity in the range of about 3 cp to 4 cp (according to an in-house viscometer), with a preferred target viscosity being 4 cp, and to produce a preform body having a suitable density.

In addition to the carbonaceous power and the solvent, a small amount of defoamer may be used in order to avoid the production of bubbles in the slurry. The occurrence of bubbles in the slurry will affect the viscosity as well as the porosity of the graphite preform by introducing large pores. Suitable defoamers decompose upon heat treatment under the conditions given to leave pure carbon without depositing metal components. A preferred defoamer is ANTIFOAM C EMULSION, available from Dow Corning, Midland, Mich. In a preferred embodiment, 1-3 drops of ANTIFOAM C EMULSION is added per ½-1 gallon of slurry.

In a preferred method of forming the slurry, the water and carbonaceous powder are mixed and ball milled for a time period in the range of from about 15 hours to about 24 hours, preferably about 24 hours. Thereafter, the phenolic resin preferably is added in powder form, and the mixture is ball milled for a time period of at least 4 hours. In some cases, where the raw materials and namely the resin have not been conditioned, several days of milling may be required. The resultant mixture may be used to form a carbonaceous preform by cold pressing, isostatic pressing, extrusion, slip casting, or any other known technique, the only limitations being those imposed by the complexity of shape of the particular component. A preferred method is slip casting.

The fabrication of the graphite preform is important due to the dependence of Si infiltration on the characteristics of the preform, where total porosity and pore size distribution will dictate the ease of infiltration as well as final composition. The preform bodies preferably have a density in the range of from about 10 vol % to about 75 vol %, most preferably in the range of from about 50 vol % to about 60 vol %.

In a preferred embodiment, the slurry is slip cast into a Plaster of Paris mold which is oversized in comparison to final product dimensions to allow for shrinkage and machining. While the molds may contain impurities which could be transferred to the slip cast part, the slip cast component is sufficiently oversized such that any impurities introduced from the molds will be removed during machining and/or during any purification treatment. Also during slip casting, the liquid in the casting slurry is pulled into the molds, which reduces the possibility of contamination from the molds, i.e., impurities would need to migrate in the opposite direction against the "flow" of liquid into the mold.

The slurry is allowed to set in the mold for a time period in the range of from about 15 hours to about 24 hours, preferably about 24 hours. The slip cast part separates from the mold, after which it is dried, followed by curing and pyrolyzation of the resin. The body is allowed to air dry for about 1 day.

Curing is accomplished at temperatures up to about 200° C., while nearly complete pyrolysis generally is achieved by 1000-1200° C. The dried preform body is heat treated at rates slow enough to avoid rupture or cracking of the preform body. The air dried preform body is placed in an oven having a temperature of not more than about 50° C. (122° F.), and is maintained at that temperature for a time in the range of from about 0.5 hour to about 1 hour, preferably about 0.5 hour. The temperature is increased by increments of about 20° C. every 1-2 hours until a temperature is reached in the range of from about 175° C. to about 200° C., preferably about 200° C. This temperature is maintained until the body is completely dry, which should range from about 1 hour to about 15 hours, preferably about 2 hours.

The preform body then is heat treated by increasing the temperature by <1 to 2 degrees per minute, depending on the thickness of the preform and its density, to a temperature in the range of 600-1200° C., preferably at least 1000° C.

After heat treatment, the preform body is premachined to "near-net-shape" or to a shape which closely approximates the dimensions of a final desired component, but is slightly oversized to allow for machining. If a high purity component is required, the component may be sent to a purification facility for "final cleaning," which involves heating to temperatures of about 2000° C. in a halogen environment or up to 3000° C. in an inert environment. If a standard purity component (<99%) is required, this heating step is probably not required. A preferred purification company is Advanced Carbon, located in Topton, Pa.

With or without final purification as described in previous paragraph, the resultant preform body has a porosity in the range of from about 10 vol % to about 75 vol %, preferably in the range of from about 40 vol % to about 50 vol %. The next step is to impregnate the graphite porous structure with Si metal, which reacts with the graphite to form SiC while concurrently eliminating open porosity.

Liquid metal infiltration processes have been the subject of hundreds of research papers, and is used in many commercial processes. The most essential parameters and mechanisms governing the infiltration of liquid Si into carbonaceous or SiC/C porous bodies have been extensively discussed in the literature. For any metal infiltration into a porous body, the wetting behavior is a critical parameter. Measurements of contact angles are used to evaluate wetting, where contact angles less than 90° C. indicate wetting where wettability increases as the contact angle decreases. Another general rule is that infiltration is enhanced if the metal reacts with the porous body.

The infiltration of Si into graphite is known to be easily accomplished, since the process is aided by the favorable wetting of graphite by liquid Si, the high reactivity of Si with graphite, the low viscosities of Si melts, and exothermic self-heating. In fact, complete infiltration of a porous graphite structure, even if driven by capillary forces alone, is feasible within a few minutes. The infiltration of Si into graphite will occur more readily than the infiltration of Si into SiC due to the higher reactivity and lower wetting angle of Si with carbon. Also, the rough surface of the graphite will contribute to higher infiltration rates since it is known that wetting and flow is enhanced by surface roughening for systems, usually reactive, that already have good wettability. Thus, processing costs are further decreased by shorter infiltration times.

The Si infiltration is very important and, for ultrapure applications, requires that no contamination occur during processing. For standard purity applications, Si metal or a Si alloy may be used. For ultrapure applications, Si of >99.9999% purity preferably is used, and the graphite kiln furniture in which infiltration is performed is of high purity such that no impurities in the graphite could vaporize at the processing temperatures and contaminate the components. The Si infiltration preferably is conducted in a nitrogen gas atmosphere after an initial vacuum is applied to purge the system.

Si metal infiltration into a carbonaceous preform is accomplished at temperatures in the range of from about 1409° C. to about 1650° C. This temperature range is significantly lower than the current commercial processing temperatures for SiC—Si diffusion components, where Si infiltration is performed at >2100° C. Much lower processing temperatures are possible due to the excellent wetting of liquid Si with graphite. Also, the exothermic reaction between Si and C gives off heat and causes localized heating within the sample to further enhance infiltration rates, which increase as temperature increases. The optimum infiltration temperature is the lowest at which Si infiltration occurs in a reasonable time period for the thickness of the piece, preferably less than one hour. Higher temperatures will increase infiltration rates, but thermal shock and cracking of the component can occur if the infiltration rate is too high.

Figure 2:
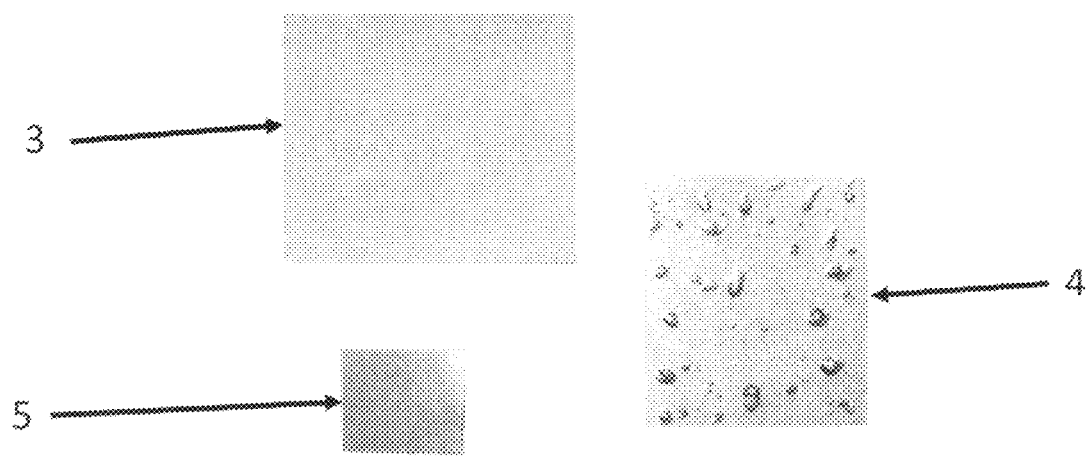
FIG. 2 is a photograph of materials at various stages of production, from carbonaceous preform to infiltrated piece to surface ground RBSC body.

In a preferred embodiment, Si metal pieces are placed in a boron nitride or siliconized SiC crucible. If a high purity component is required, Si metal is used which has a resistance of 1 Ω-cm or an impurity level in the range of from about 100 ppb to about 300 ppb, depending upon whether the Si is n- or p-type. The preform (see 3 in FIG. 2) is placed on top of the Si pieces, preferably at room temperature. The crucible is placed in the hot zone of the furnace, where the heating can be conventional such as by graphite resistance or radiant heating, or by induction or microwave heating. A vacuum is applied in the range of from about 5 millitorr to about 500 millitorr, or a slight positive pressure can be used in the range of from about 70.31 $g/cm^2$ (1 psi) to about 210.93 $g/cm^2$ (3 psi). The crucible is heated from room temperature to about 1360° C. at a rate of increase of about 20-25° C./min. Thereafter, the rate of heating preferably is decreased to about 10°/min until the temperature exceeds the melting point of Si (1409° C.), preferably to about 1450-1800° C., most preferably to about 1600° C. At rates below about 1° C./min, extensive cracking was seen. At rates above about 1° C./min, very little cracking is seen, and the cracking tends to be surface cracking. Since a higher rate of increase in temperature translates to a shorter cycle time, a rate of 10°/min was chosen as preferred. At this point, infiltration readily occurs due to the reactivity of Si with carbon producing a component such as 4 in FIG. 2. The chamber then preferably is cooled at a rate of about 1° C./min to about 1380° C., although higher cooling rates may be used. The power is turned off, and the materials are allowed to cool to room temperature. The piece may be surface ground to produce a surface quality such as shown in 5 in FIG. 2.

Si is unusual in that it undergoes an expansion upon cooling such that Si exudes from the composite. Many impurities are soluble in liquid Si. By unidirectionally infiltrating the Si, the Si can be made to act as a solvent for the large scale transport of impurities insoluble in SiC. As the Si rises through the preform body, impurities in the preform body dissolve in the Si and rise with the Si from the initially contacted surface at the bottom of the preform body to the opposed surface at the top of the preform body. Most of the impurities will exude or be squeezed out of the preform body along with the Si. The Si metal travels from the bottom to the top of the sample during Si infiltration, ultimately exuding on the surface and providing a self-cleaning means to sweep impurities out of the sample. The resulting Si "blobs" (see 4 in FIG. 2) at the surface of the body can be removed during final machining. Components of SiC—Si produced in this manner highlight a self-cleaning process which will even further increase the product purity.

Final finishing involves sand blasting or diamond tool machining any residual Si from the surface of the components. For high purity components such as for the semiconductor industry, high purity particles are used to prevent any possible contamination. Notches in the final component which will contact Si wafers are subject to strict tolerances, and necessitate post machining. For ultrahigh purity, a SiC surface coating may be applied using CVD, if desired.

The final product is composed of SiC and Si (or an alloy thereof). For high purity components, hot gas cleaning effectively removes contamination from the surface and near-surface to result in a pure $SiO_2$ surface layer. The impurities are removed through reaction of chlorine ions at elevated temperatures up to and exceeding 1300° C., preferably up to 1350° C., with impurities such as Fe and Na to form gaseous chlorides which are removed in the flow of halogen gas. At the same time, a $SiO_2$ surface layer several thousand Angstroms thick is formed, and provides increased protection from contaminants. Substantially any commercial company with hot gas cleaning capabilities may be used to perform the required purification. If the proper equipment is available, the purification also may be performed in-house.

For high purity components where final cleaning is performed, a de minimus amount of Si dioxide may be present. The porosity of the product is <5%, but preferably <1%. The SiC—Si component may be packaged using known procedures.

The invention will be better understood with reference to the examples, which are illustrative only and should not be construed as limiting the invention as defined by the claims:

EXAMPLE 1

Porous carbonaceous preforms were fabricated according to Example IV, and sent to Advanced Carbon (Topton, Pa.) for heat treatment to 2000° C. in chlorine and 2800° C. in nitrogen. The samples were about 4×5×1.5" rectangular bodies. Visually after heat treatment at 2000° C., there was no change. After 2800° C. heat treatment, a large amount of porosity was observed indicating volatilization of impurities. If the exotherm achieved for a sample of this size exceeds that required to volatilize the impurities in the preform, a great amount of porosity or areas of excess Si would be produced in the RBSC product.

To identify the source of the impurities, ICP analyses were performed at Asbury Graphite Mills, where it was determined that the phenolic resin was of very high purity, and likely not the source. Analysis of Castmate, an additive used to decrease casting times of large pieces, showed that there was a significant amount of sodium at 1958 ppm. Sodium was also found to be a larger component of cast pieces (consisting of dispersant, phenolic resin, and graphite) without Castmate, where a recent analysis at Asbury Graphite Mills identified 2026 ppm sodium. Also identified were Si (1351 ppm), Fe (309 ppm), Ca (294 ppm), Al (193 ppm), Mg (63) and K (51 ppm). Since the resin has been found to be very pure, these impurities most likely originated from the graphite powder and possibly the dispersant. This investigation is continuing, but highlights the need to have careful consideration of the raw materials used for making RBSC from carbonaceous preforms. Purification of graphite powders prior to preform fabrication may be required depending on the size of the component and the temperature reached as a result of the exotherm.

EXAMPLE II

The following experiments were performed to determine the amount of dispersant necessary to achieve a uniform dispersion of powder at various powder loadings. Slurries were formed using HPM850 graphite powder and DUREZ PHENOLIC resin at a ratio of 1:1. Slurries containing the wt % of the dispersant and power loadings shown in the following table were formed, and resulted in the given viscosity readings using an in-house Brookfield viscometer:

| Dispersant Amount (wt %) | Powder (graphite + resin) Loading (wt %) | Viscosity Reading |
| --- | --- | --- |
| 10 | 32 | 3.5 |
| 10 | 40 | 9 and rising |
| 10 | 45 | 9 and rising |
| 6 | 32 | 5 and rising |
| 6 | 49 | 7 and rising |
| 6 | 45 | 9 and rising |
| 7 | 32 | 2.8-3.5 |
| 7 | 34 | 3.8-4 |
| 7 | 36 | 4.5 and rising |
| 7 | 40 | 10 and rising |

The slurries exhibited non-Newtonian behavior, where the viscosity was dependent upon the duration of shear. In other words, the viscosity of the slurries which were not sufficiently well-dispersed (with enough dispersant and low enough powder loading) increased with time at a constant shear rate ("rising" in table). Thus, the determination of the optimum amount of dispersant and powder loading was based on identifying slurries whose viscosities were low to begin with (say, <5 cp) and which did not increase with time. A slurry with a powder loading of about 34 wt % containing 7 wt % dispersant was chosen as preferred because the resulting slurry had a low viscosity which did not increase with time. Such slurries can be used for slip casting or dry pressing. For dry pressing, the same Powder of Paris plaster molds can be used to efficiently and quickly remove the water, followed by drying in a drying oven at temperature below which the resin starts to cure, grinding in a mortar and pestle, and sieving.

EXAMPLE III

Tests were performed to determine the bulk density of the final products using various materials. Theoretically, in order to achieve a composite with 85% SiC-15% Si, the final density would be 3.078 g/cc (if zero porosity). The following table gives measured density (and porosity) results for various infiltrated composites as determined according to Archimedes density measurement procedure. These results indicate that the composites contained slightly less than 85 vol % SiC.

| Type of Powder | Powder Supplier | % Graphite | % Resin | Preform Density | Apparent Porosity | Specific Gravity | Bulk Density |
| --- | --- | --- | --- | --- | --- | --- | --- |
| HPM-850 | Asbury | 60 | 40 | 48% | 2.97% | 3.03 g/cc | 2.94 g/cc |
| M-240 | Asbury | 60 | 40 | 57% | 6.24% | 2.96 g/cc | 2.77 g/cc |
| TIMREX KS6 | Timcal | 45 | 55 | 50% | 1.48% | 3.04 g/cc | 3.00 g/cc |

EXAMPLE IV

A slurry is prepared having a final composition as follows: 77 vol % water, 23 vol % carbonaceous powder, comprising 50 vol % HPM-850 graphite powder and 50 vol % DUREZ PHENOLIC, 1-3 drops of ANTIFOAM C EMULSION, and DISPERSE-AYD W22 (now called NUOSPERSE W22) in an amount of 7 wt % based on the total weight of graphite and resin powders. The water, dispersant, and HPM-850 graphite powder are mixed and ball milled for 24 hours. The phenolic resin is added, and the mixture is ball milled for 24 hours. The resulting mixture is slip cast into a Plaster of Paris mold for a wafer carrier and allowed to set overnight.

The slip cast component is removed from the Plaster of Paris mold and allowed to air dry for 1 day. Thereafter, the slip cast components is placed in an oven having a temperature of not more than 50° C. (122° F.). The component is maintained at that temperature for about 1 hour, and the temperature is increased by increments of about 20° C. every hour until a temperature of about 200° C. is reached. In order to avoid adsorption of water from the air, the component is not removed from the oven until it is time for infiltration. The slip cast component is heat treated by increasing the temperature slowly up to at least 625° C. but preferably 1000° C. and more preferably 1200° C. The heating rate depends on the thickness of the component, where thicker pieces require slower heating rates. Typically <1 degree per minute is slow enough that the component does not crack or warp.

The heat treated component is then premachined to near-net-shape. If an higher purity component is required, the piece may be then purified at Advanced Carbon who has two purification treatments: (1) 2000° C. in chlorine environment, and (2) 2800-3000° C. in nitrogen.

In order to infiltrate Si into the purified product and using conventional heating, Si pieces having an impurity level of 100-300 ppb are placed in a siliconized grafoil container. If microwave heating is used, then a boron nitride crucible is required, and the silicon source must be powders—the larger the size the better.

The carbonaceous preform is placed directly on top of the Si pieces. A wicking mechanism may be used (such as described in Brun et al., U.S. Pat. No. 5,205,970) where the actual piece is not in contact with the Si, but suspended above the Si by several means.

In the invention described here, wicking is not necessary but if "cleaner" products with less residual Si on the surface are desired, the piece itself could have sacrificial "legs" that can be easily broken off after infiltration.

No matter the heating method, a vacuum is preferred. However, running with a combination of vacuum and positive gas (nitrogen) pressure will also give good results. In this example, the carbonaceous preform/Si metal setup is placed under a vacuum of about 300 millitorr and heated to about 1000° C. at a rate of about 25° C./minute. Nitrogen gas is then introduced until a positive pressure in the range of from about 1 to about 3 psi is achieved. The temperature then is increased at a rate of about 20° C./minute to 1380° C. Thereafter, the rate of heating is controlled at 10° C./minute until a temperature of 1600° C. is reached. The chamber then is cooled at a rate of about 1° C./minute to 1380° C., the power is turned off, and the materials are allowed to cool to room temperature. Once cooled, the preform is machined into a final wafer carrier.

The final product is composed of about 85% SiC, 15% Si, and a de minimus amount of Si dioxide. Impurity levels are about 55 ppm or less. The porosity of the final product is about 1%, the bulk density is about 3 g/cc, and the 3-point flexural strength is about 480 MPa.

Persons of ordinary skill in the art will recognize that many modifications may be made to the present invention without departing from the spirit and scope of the present invention. The embodiments described herein are meant to be illustrative only and should not be taken as limiting the invention, which is defined in the claims.

PRIOR ART

There are previous patents regarding infiltrating carbon bodies with silicon metal to form RBSC. However, the carbon bodies are thin sheets and not bulk bodies described here. The carbon bodies are described as "a graphite sheet, a carbon sheet, a carbon felt, a carbon fiber cloth, etc." (Col. 4, lines 9-10 in Hanzawa et al., U.S. Pat. No. 5,338,576), none of which contain an organic binder as in this invention. Hanzawa states that prior art methods combining carbon powders, silicon powders and binders produce "thick ceramics" that tend to have a reduced thermal shock resistance and limited oxidation resistance. Hanzawa claims to solve the foregoing problems of reduced thermal shock and limited oxidation resistance by using "a thin silicon carbide sintered article". The invention described here is applicable to non-flexible, carbonaceous preforms above a certain size where infiltration is difficult due to higher temperatures reached as a result of the exothermic reaction. In addition, the infiltration described here is performed with both the carbonaceous preform and Si at contact prior to heating and melting the Si. Brun et al. (U.S. Pat. No. 5,205,970) teaches the use of a wicking means or intermediate structure between the carbonaceous preform and Si metal, which is different than the direct contact proposed here.

There are other related patents, most of which have either expired or been abandoned. Most involve producing RBSC by conventional means by infiltrating SiC preforms rather than essentially all-carbon preforms using an organic binder as an integral component and directly contacting with solid Si metal at room temperature as proposed here. Others involve using fibrous preforms or contain a multitude of other components, rather than an essentially all-carbon particulate preform.

What is claimed is:

1. A method for forming a component for chemically stable, high temperature applications, the method comprising:
   a. obtaining a preform having at least 99.995% carbon, wherein
      (1) the preform is fabricated from a mixed powder comprising a carbon powder and organic binder powder;
      (2) the carbon powder has an average particle size of less than or equal to 15 microns;
      (3) the binder powder has an average particle size from about 15 to about 30 microns;
      (4) the mixed powder includes at least 30 wt % binder powder;
      (5) the preform has a porosity of from 40% to 60%; and
      (6) the preform was heated to a temperature from 600 to 3000° C.; and
   c. infiltrating the preform with a melt comprising 99.999% silicon to form the component having less than or equal to about 55 parts per million of other than silicon and silicon carbide and a 3-point flexure strength of at least 200 MPa.

2. The method of claim 1 wherein the binder powder consists essentially of phenolic resin.

3. The method of claim 1 wherein the component has a volume, and a percentage of silicon carbide formed during infiltrating is in the range from 60 to 95 percent of the volume of the component.

4. The method of claim 1 wherein the component has a volume, and a percentage of silicon carbide is about 85 percent of the volume of the component.

5. The method of claim 1 wherein obtaining the preform comprises forming the preform by slip casting of a slurry, wherein
   a. the slurry consists essentially of a liquid and the mixed powder; and
   b. the slurry has a viscosity between 3 and 4 centipoise.

\* \* \* \* \*